(12) United States Patent
Weigand et al.

(10) Patent No.: US 11,847,254 B2
(45) Date of Patent: Dec. 19, 2023

(54) VOLTAGE OVERRIDE DEVICE FOR PHYSICAL INTRUSION PREVENTION ON A DATA BUS

(71) Applicant: Shift5, Inc., Rosslyn, VA (US)

(72) Inventors: Phillip T. Weigand, Fairfax, VA (US); Matthew J. Rogers, Huntsville, AL (US); Olivia I. Puleo, Baltimore, MD (US); Joshua A. Lospinoso, Kailua, HI (US); Michael A. Weigand, Vienna, VA (US)

(73) Assignee: Shift5, Inc., Rosslyn, VA (US)

( * ) Notice: Subject to any disclaimer, the term of this patent is extended or adjusted under 35 U.S.C. 154(b) by 0 days.

(21) Appl. No.: 17/581,094

(22) Filed: Jan. 21, 2022

(65) Prior Publication Data

US 2023/0237206 A1    Jul. 27, 2023

(51) Int. Cl.
*G06F 21/85* (2013.01)
*G06F 21/81* (2013.01)

(52) U.S. Cl.
CPC .............. *G06F 21/85* (2013.01); *G06F 21/81* (2013.01)

(58) Field of Classification Search
CPC .................................. G06F 21/85; G06F 21/81
See application file for complete search history.

(56) References Cited

U.S. PATENT DOCUMENTS

| | | | |
|---|---|---|---|
| 8,549,630 B2* | 10/2013 | Villasenor | G06F 21/85 714/699 |
| 9,367,697 B1* | 6/2016 | Roth | H04L 9/0897 |
| 10,027,711 B2* | 7/2018 | Gill | H04L 63/1441 |
| 10,127,409 B1* | 11/2018 | Wade | G06F 21/75 |
| 10,235,523 B1* | 3/2019 | Keller, III | G06F 13/4282 |
| 10,417,458 B2* | 9/2019 | Hoppert | G06F 9/442 |
| 10,621,590 B2* | 4/2020 | Rezayee | G06Q 20/409 |
| 11,048,828 B2* | 6/2021 | Bitton | G06F 21/64 |
| 11,112,466 B2* | 9/2021 | Schweitzer, III | G01R 19/2513 |
| 11,165,821 B2* | 11/2021 | Stevens | H04L 12/40136 |
| 2019/0385057 A1* | 12/2019 | Litichever | H04L 63/14 |
| 2020/0036748 A1* | 1/2020 | Tebekaemi | H04L 63/0428 |
| 2020/0302054 A1* | 9/2020 | Liu | G06F 21/552 |
| 2021/0334373 A1* | 10/2021 | Yanamadala | G06F 21/552 |
| 2021/0334415 A1* | 10/2021 | Yanamadala | G06F 21/76 |
| 2022/0414274 A1* | 12/2022 | Weber | G06F 21/85 |

* cited by examiner

*Primary Examiner* — Viral S Lakhia
(74) *Attorney, Agent, or Firm* — Myers Bigel, P.A.

(57) ABSTRACT

An apparatus for preventing physical intrusion on a data bus includes a data bus state sensor coupled to the data bus for monitoring a state of the data bus, a power circuit for generating multiple voltages supplied to functional circuitry in the apparatus, and a variable override circuit. The variable override circuit receives one or more voltages from the power circuit and selectively gates the voltages onto the data bus as a function of one or more control signals. A controller coupled to the variable override circuit, the power circuit and the state sensor receives state information from the state sensor and generates the control signals in response to detection of physical intrusion on the data bus. The controller controls a voltage level of at least one of the voltages generated by the power circuit for overriding the data bus when physical intrusion is detected on the data bus.

21 Claims, 6 Drawing Sheets

VOLTAGE OVERRIDE DEVICE FOR PHYSICAL INTRUSION PREVENTION ON A DATA BUS

BACKGROUND

The present invention relates generally to the electrical, electronic and computer arts, and, more particularly, to secure communications between computing devices connected to a data bus.

Unauthorized changes to firmware, software, and/or information can occur due to errors or malicious activity (e.g., tampering), among other factors. Firmware is software that is embedded into a hardware device and generally consists of a set of commands that control how the device functions. Software includes, for example, operating systems (with key internal components such as kernels, drivers), middleware, and applications. Firmware includes, for example, a basic input output system (BIOS). Information includes metadata such as, for example, security attributes associated with information.

When a vendor releases the latest version of firmware for a certain device, the existing firmware in the device is updated to the latest release. This process is often known as a firmware upgrade or firmware update. Conventionally, updating firmware or software of computing devices (e.g., electronic control units (ECUs)) connected together via a serial data bus or similar network architecture typically involves transferring binary images comprising firmware or software update files via the data bus to a connected target computing device(s) to be updated.

Although there are some known approaches for preventing unauthorized software or firmware upgrades, for example by cryptographically validating software signing signatures such as those commonly employed by public key infrastructure (PKI) backed software validation schemes, there are no known mechanisms for preventing the completion of invalid (e.g., unauthorized, malicious, corrupted, etc.) data transmissions between two or more computing devices once transmission has already begun.

SUMMARY

The present invention, as manifested in one or more embodiments thereof, beneficially provides a mechanism for physical intrusion prevention on a data bus, which includes preventing the completion of unauthorized or otherwise invalid transmissions between two or more computing devices connected through a data bus or other connection arrangement (e.g., communication network), even after the unauthorized transmission has started. An apparatus according to one or more embodiments of the invention advantageously checks to determine whether a data bus transmission is valid. When physical intrusion on the data bus is detected, the apparatus initiates a bus override routine whereby the apparatus manipulates the bus, for example by either holding the bus to a prescribed voltage level or by overwriting the bus with a prescribed data message. This technique supports passive and/or active operational modes for use with differing customer requirements.

In accordance with one or more embodiments of the invention, an exemplary apparatus for preventing physical intrusion on a data bus includes a data bus state sensor operatively coupled to the data bus and configured to monitor a state of the data bus, and a power circuit for generating multiple voltages supplied to functional circuitry in the apparatus. The apparatus further includes a variable override circuit coupled to the data bus and the power circuit. The variable override circuit is configured to receive one or more voltages from the power circuit and to selectively gate the one or more voltages onto the data bus as a function of one or more control signals provided to the variable override circuit. A controller included in the apparatus is coupled to the variable override circuit, the power circuit and the data bus state sensor. The controller is configured to receive data bus state information from the data bus state sensor and to generate the one or more control signals provided to the variable override circuit in response to detection of physical intrusion on the data bus. The controller is configured to control a voltage level of at least one of the plurality of voltages generated by the power circuit for overriding the data bus when physical intrusion is detected on the data bus.

In accordance with another embodiment of the invention, an exemplary method is provided for use in conjunction with a voltage override device for preventing physical intrusion on a data bus. The method includes: collecting bus data for analysis; determining whether a transmission on the data bus is valid based at least in part on the collected bus data; sending an alert signal to the voltage override device when physical intrusion is detected on the data bus; initiating a bus override procedure in response to receipt of the alert signal by the voltage override device, whereby the voltage override device takes control of the data bus for a prescribed period of time; and releasing the data bus by the voltage override device once the prescribed period of time has elapsed.

In accordance with yet another embodiment of the invention, an exemplary computer program product for preventing physical intrusion on a data bus is provided. The computer program product including a non-transient computer readable storage medium having computer readable program code embodied thereon, the computer readable program code, when executed on at least one processor of a security appliance coupled to the data bus, causing the security appliance: to collect bus data for analysis; to determine whether physical intrusion has occurred on the data bus based at least in part on the collected bus data; to send an alert signal to a voltage override device when physical intrusion is detected on the data bus, the alert signal causing the voltage override device to initiate a bus override procedure, whereby the voltage override device takes control of the data bus for a prescribed period of time; and to cause the voltage override device to release the data bus once the prescribed period of time has elapsed.

As may be used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of means for carrying out one or more of the method steps described herein; the means can include (i) hardware module(s), (ii) software and/or software module(s) stored in a computer readable storage medium (or multiple such media) and implemented on a hardware processor, or (iii) a combination of (i) and (ii); any of (i)-(iii) implement the specific techniques set forth herein.

Techniques disclosed herein can provide substantial beneficial technical effects. By way of example only and without limitation, embodiments of the invention, either individually or collectively, can provide one or more of the following advantages:

- prevents the completion of invalid (e.g., unauthorized, malicious, corrupted, etc.) transmissions between two or more computing devices without modifying existing hardware or software in the computing devices;
- supports passive and/or active operational modes for use with differing customer requirements and applications;
- ability to identify, alert and/or halt an invalid transmission after the originating device has started transmitting data across the data bus to one or more target computing devices;
- no changes to the existing network architecture are required in order to benefit from security measures according to aspects of the invention.

These and other features and advantages will become apparent from the following detailed description of illustrative embodiments thereof, which is to be read in connection with the accompanying drawings.

BRIEF DESCRIPTION OF THE DRAWINGS

Non-limiting and non-exhaustive embodiments of the present invention will be described with reference to the following drawings which are presented by way of example only, wherein like reference numerals (when used) indicate corresponding elements throughout the several views unless otherwise specified, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present disclosure will be described herein in the context of illustrative methods, apparatus and systems for facilitating secure bus communications between computing devices connected together on a data bus (e.g., a controller area network (CAN) bus) or other established communication channel, and more particularly to techniques for physical intrusion prevention on a data bus. Embodiments of the invention are particularly well-suited to transportation vehicles, weapon systems and/or other secure systems applications. It is to be appreciated, however, that the specific methods, apparatus and/or system illustratively shown and described herein are to be considered exemplary as opposed to restrictive. Rather, it will become apparent to those skilled in the art given the teachings herein that numerous modifications can be made to the embodiments shown that are within the scope of the appended claims. That is, no limitations with respect to the embodiments shown and described herein are intended or should be inferred.

Modern secure systems, including those employed by transportation vehicles, operating in conventional network architectures currently have little or no protection from cyberattacks. Malicious software and/or firmware updates in particular are often used to exploit vulnerabilities in a networked system. When a vendor releases the latest version of firmware for a certain device, the existing firmware in the device is updated to the latest release. This process is often known as a firmware upgrade or firmware update. Conventionally, updating firmware or software of computing devices (e.g., electronic control units) connected together via a serial data bus or similar network architecture typically involves transferring binary images comprising firmware or software update files via the data bus to a connected target computing device(s) to be updated.

Although there are some known approaches for preventing unauthorized software or firmware upgrades, for example by cryptographically validating software signing signatures such as those commonly employed by public key infrastructure (PKI) backed software validation schemes, there are unfortunately no known mechanisms for stopping malicious upgrades from being transmitted across a data bus once data transmission has already started.

The present invention, as manifested in one or more embodiments thereof, beneficially provides a mechanism for passively monitoring, alerting and preventing the completion of unauthorized or otherwise invalid firmware and/or software upgrade image transmissions between two or more computing devices connected through a data bus or other connection arrangement (e.g., communication network). An apparatus according to one or more embodiments of the invention advantageously checks to determine whether a given firmware or software update is valid. When a valid update is detected, it is allowed to proceed on the bus without intervention from the apparatus. However, when an invalid update is found, the apparatus initiates a bus override routine, whereby the apparatus manipulates the bus, for example by holding the bus to a prescribed voltage level or by overwriting the bus with a prescribed data message. This technique supports passive and/or active operational modes for use with differing customer requirements.

Figure 1:
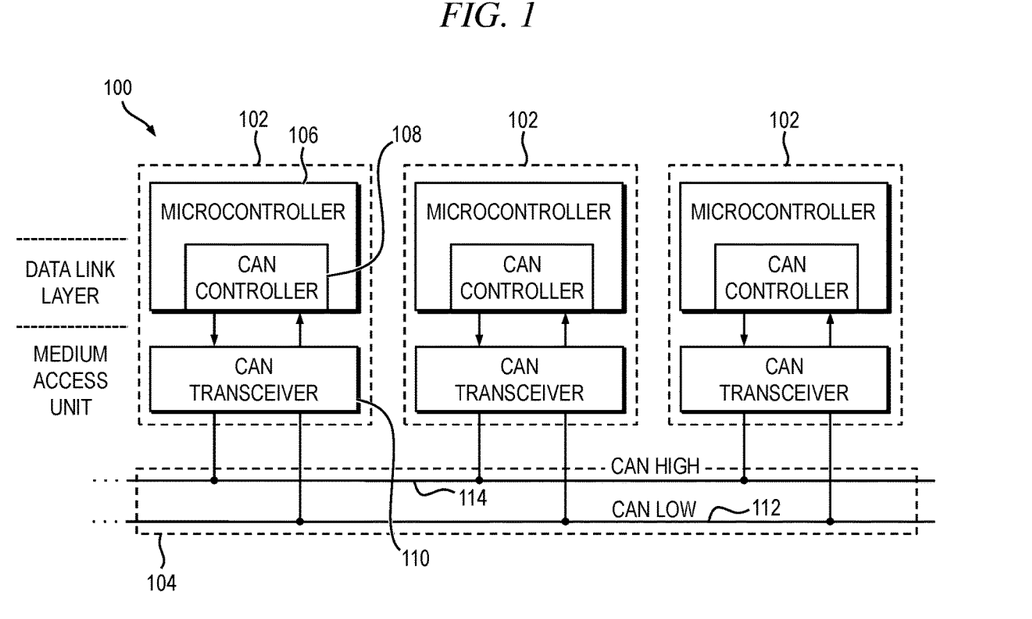
FIG. 1 is a block diagram conceptually depicting at least a portion of an exemplary controller area network (CAN) bus system, including a plurality of electronic control units (ECUs), each of which forms a node in the CAN system, operatively coupled to a CAN bus.

By way of example only and without limitation, one or more embodiments of the invention are adapted for use in connection with a controller area network (CAN) bus architecture employing a CAN bus protocol. FIG. 1 is a block diagram conceptually depicting at least a portion of an exemplary CAN bus system 100, including a plurality of electronic control units (ECUs) 102, each of which forms a node in the CAN system, operatively coupled to a CAN bus 104. Each of at least a subset of the ECUs 102 includes a microcontroller or other central processing unit (CPU) 106, which is configured to control an overall operation of the ECU, and a CAN controller 108, which forms a data link layer in the CAN protocol. The data link layer is a CAN sublayer which provides, for example, logic link control, media access control and physical coding, among other functionality.

The CAN controller 110 is configured to communicate with a CAN transceiver 110 included in the ECU 102, which implements a medium access unit. The CAN transceiver 110 is operatively connected to the CAN bus 104 and includes circuitry configured to interface with the CAN bus by adapting the signal levels of both data sent and received by the ECU 102. All ECUs 102 are operative to send and receive data, although not at the same time.

The CAN bus 104 uses two dedicated wires for communication; namely, a CAN low wire 112 and a CAN high wire 114. When the CAN bus 104 is in an idle state, both wires 112, 114 typically carry about 2.5 volts (V), and thus a differential voltage across the two wires is zero (or nearly zero) volts. When data bits are being transmitted, the CAN high wire 114 goes to a high voltage level, typically about 3.75 V, and the CAN low wire 112 drops to a low voltage level, typically about 1.25 V, thereby generating a measurable differential voltage of about 2.5 V between the high and low wires. This differential voltage scheme used by the CAN bus protocol provides a robust and reliable communication methodology which is highly insensitive to inductive spikes, electrical fields, or other noise.

The CAN bus system 100 enables each ECU 102 to communicate with all other ECUs connected on the CAN bus 104, without complex dedicated wiring. Specifically, an ECU 102 can prepare and broadcast information (e.g., software update information) via the CAN bus 104. The broadcasted data is accepted by all other ECUs 102 in the CAN system 100, and each ECU can then check the data and decide whether to receive or ignore the data. ECUs 102 cannot send data directly to each other. Instead, they transmit their data onto the CAN bus 104, where it is available to any node to which the data has been addressed. The CAN protocol is lossless, employing a bitwise arbitration method to resolve contentions on the bus. Thus, CAN is a message-based protocol designed to allow the ECUs 102 to communicate with each other across the CAN bus 104 in a reliable, priority-driven manner. Messages or "frames" are received by all ECUs 102 in the network 100, without the need for a host computer. The most common CAN physical layer standard is ISO 11898-1, the disclosure of which is incorporated by reference herein in its entirety for all purposes, although other standards may also be employed.

All of the ECUs 102 in the CAN bus system 100 are synchronized so that they sample data on the network simultaneously. However, data is not transmitted with clock (time) information, so CAN is not truly a synchronous bus, such as EtherCAT, for example. According to the CAN protocol, all data are sent in one of four frame types: (i) data frames, which transfer data to one or many receiver nodes; (ii) remote frames, which request data from other nodes; (iii) error frames, which report errors; and (iv) overload frames, which report overload conditions.

Figure 2:
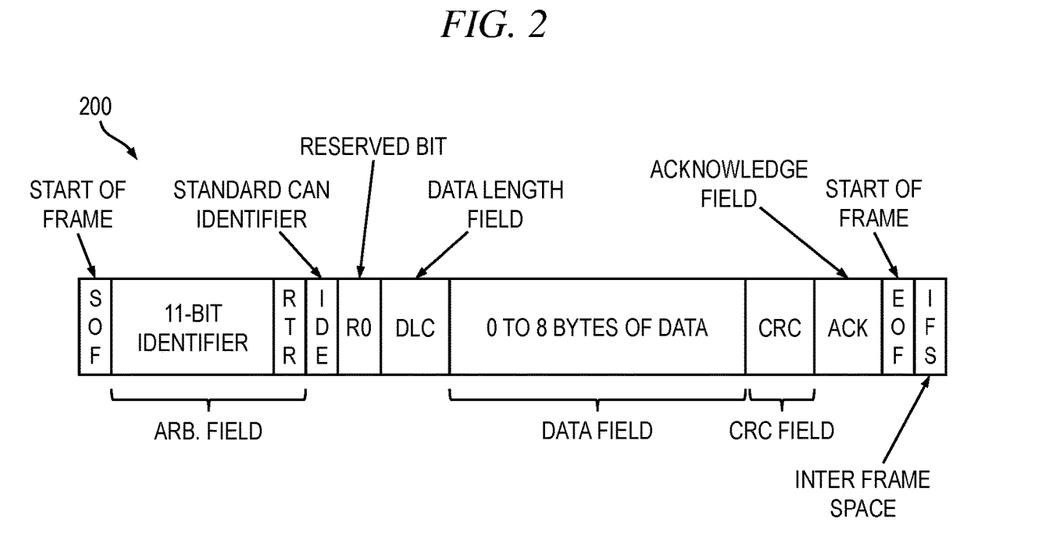
FIG. 2 conceptually depicts a standard CAN data message frame according to the CAN bus protocol standard.

FIG. 2 conceptually depicts a standard CAN data message frame 200 according to the CAN bus protocol. As shown in FIG. 2, the standard CAN data message frame 200 is comprised of a plurality of fields, including a one-bit start-of-frame (SOF) field which marks the start of a message and synchronizes the ECU nodes following an idle period, an 11-bit data identifier field which sets the message priority (lower values equate to higher priority), a one-bit remote transmission request (RTR) field which is dominant when information is requested by another node, a one-bit identifier extension (IDE) field which indicates that a standard CAN identifier is being transmitted, a one-bit reserved (R0) field, a four-bit data length code (DLC) field which contains the number of bytes in the transmission, a 0 to 64-bit data field which contains the actual payload data being transmitted, a 16-bit cyclic redundancy check (CRC) field which contains a checksum of the preceding payload data for error detection purposes, a two-bit acknowledgment (ACK) field which indicates when a node successfully received a message, a seven-bit end-of-frame (EOF) field which denotes the end of every CAN frame (message), and an inter-frame space (IFS) field containing three or more consecutive message bits which, after three recessive bits have passed, when a dominant bit is detected, it becomes the SOF bit denoting the start of the next CAN data message frame.

Although embodiments of the present invention are well-suited for use in conjunction with a CAN bus architecture, and aspects according to one or more embodiments of the invention will be described herein in the context of a CAN bus architecture, it is to be appreciated that the invention is not limited to any specific bus architecture or protocol. Rather, embodiments of the invention can be used with other bus architectures and/or protocols, as will become apparent to those skilled in the art given the teachings herein.

As previously stated, an apparatus according to one or more embodiments of the invention advantageously checks to determine whether a firmware and/or software update is valid. If the update is determined to be valid, the update message is allowed to proceed on the bus in a normal manner without intervention by the apparatus. However, when an invalid update is detected, the apparatus beneficially performs one or more actions to prevent the invalid update from completing, as will be described in further detail herein below in connection with FIG. 3.

Figure 3:
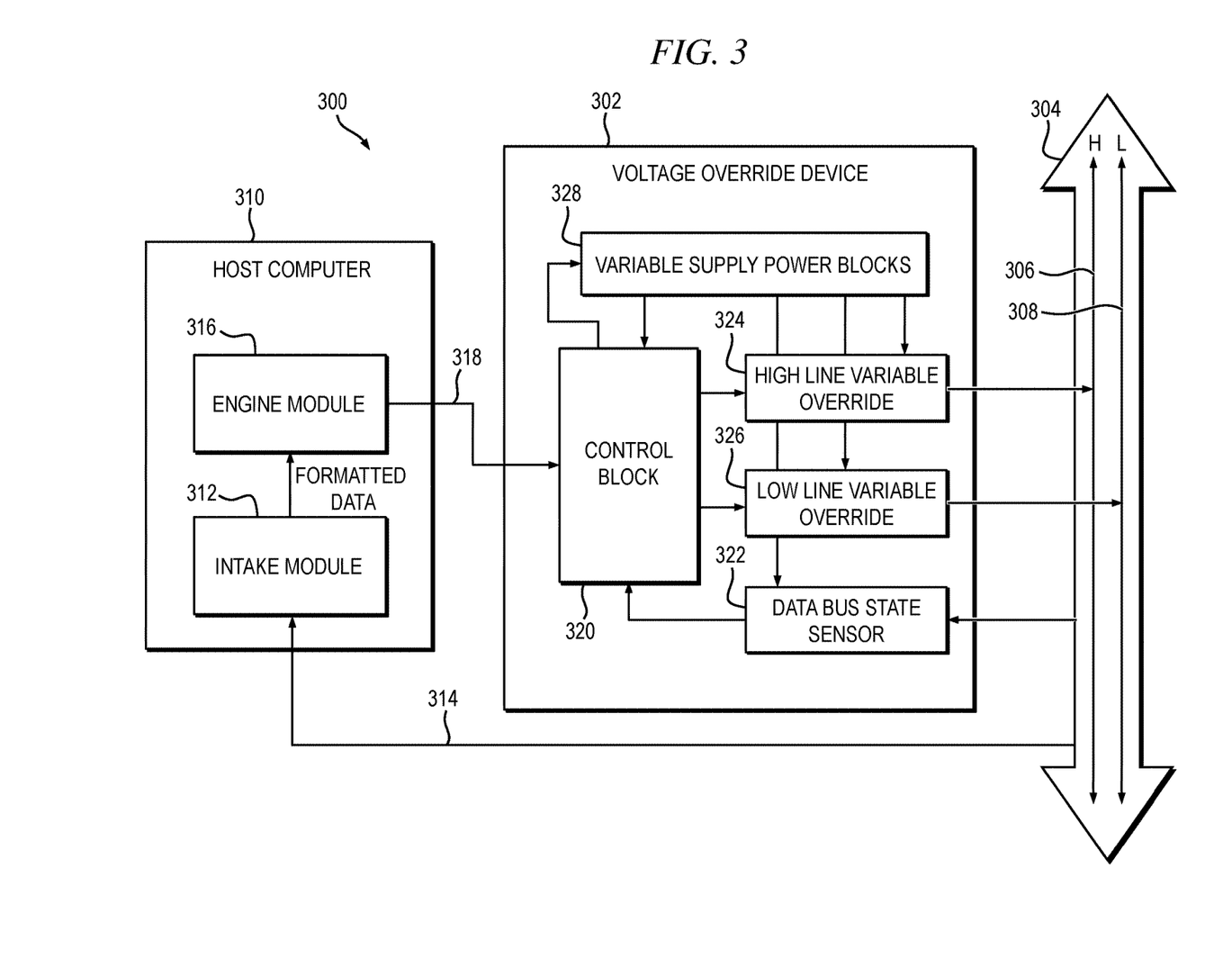
FIG. 3 is a block diagram depicting at least a portion of an exemplary system for preventing the completion of invalid (e.g., unauthorized, malicious, corrupted, etc.) communications on a serial communication bus (e.g., CAN bus), according to one or more embodiments of the present invention.

More particularly, FIG. 3 is a block diagram depicting at least a portion of an exemplary system 300 for preventing the completion of invalid (e.g., unauthorized, malicious, corrupted, etc.) software and/or firmware updates on a communication bus (e.g., CAN bus), according to one or more embodiments of the invention. The system 300 includes a voltage override device (VOD) 302—a security appliance in which aspects according to embodiments of the invention are implemented. The VOD 302 is operatively coupled with a communication data bus 304, which is preferably a serial data bus, such as a CAN bus, in one or more embodiments. As previously stated, in a CAN bus architecture, the data bus 304 comprises two dedicated lines; namely, CAN bus high (H) 306 and CAN bus low (L) 308. In alternative embodiments, when used in conjunction with other communication buses and/or communication protocols, different bus lines/connections may be employed, with or without modification of the VOD 302. A plurality of ECUs (e.g., ECUs 106 shown in FIG. 1), not explicitly shown in FIG. 3 but implied, are preferably connected to the data bus 304 and are configured for communicating with one another via the bus.

The system 300 further includes a host computer 310 which is operatively coupled with the VOD 302 and the data bus 304. The host computer 310 includes an intake module 312, which is preferably implemented in software running on one or more processors of the host computer. A connection 314 between the data bus 304 and the intake module 312 enables the host computer 310 to monitor and collect serial data conveyed on the bus. This collected serial data can be subsequently processed (e.g., analyzed) and used to determine the state of the bus at any given time, and whether an invalid update is being sent on the bus, among other uses.

The host computer 310 further includes an engine module 316, which is preferably implemented in software running on one or more processors of the host computer. The engine module 316 is adapted to receive the serial bus data, formatted by the intake module 312 and supplied to the engine module as an output thereof, and is configured to analyze the received serial bus data and make prescribed decisions and/or take action based at least in part on the serial bus data. The engine module 316 preferably communicates with the VOD 302 via a connection 318, which may be wired or wireless.

In one or more embodiments, the VOD 302 includes a control block (i.e., controller) 320 in operative communication with the engine module 316 in the host computer 310 via the connection 318. The control block 320 may comprise one or more microprocessors and/or microcontrollers configured to implement prescribed actions as a function of one or more control signals supplied to the control block. In one or more embodiments, connection 318 may comprise a Universal Serial Bus (USB) connection, and the engine module 316 may use a software development kit (SDK), application programming interface (API), or other suitable means to communicate with the control block 320 via the USB connection. The control block 320 is preferably adapted to receive instructions from the engine module 316 to start or stop an override of the data bus 304.

The control block 320 may also receive bus state information from a data bus state sensor 322 in the VOD 302. In one or more embodiments, the data bus state sensor 322 is coupled to the data bus 304 and includes voltage level sensing circuitry (e.g., a comparator or the like) to monitor a differential voltage across the CAN high and low bus wires 306, 308 for determining the state of the bus. As previously explained, in the context of a CAN protocol, the CAN bus is based on differential signaling. The two bus lines, CAN bus high 306 and CAN bus low 308, are both at the same potential (e.g., about 2.5 V) when the data bus 304 is in an idle state, and thus the measured differential voltage across the bus would be zero or nearly zero. To send data on the bus 304, a CAN transmitter in a given ECU node sends a differential voltage of about 2.5 volts on the lines 306, 308.

When not idle (e.g., when two nodes are transmitting), the CAN data bus 304 may either be in a dominant state or a recessive state, which can be sensed by detecting the voltage present on the CAN bus high and low lines 306, 308. During a dominant bus state, the CAN bus high line 306 is forced high (e.g., about 3.75 V) and the CAN bus low line 308 is forced low (e.g., about 1.25 V). Similarly, during a recessive bus state, the CAN bus high line 306 and the CAN bus low line 308 are equal, such as, for example, at a middle voltage of about 2.5 V. If one node sends a dominant bit and another sends a recessive bit, the bus will be in a dominant state; the bus will be in a recessive state when all nodes send a recessive bit. Automatic arbitration is built into the CAN protocol, as all nodes must monitor the bus state during transmission and cease transmission if a dominant bit is detected when sending a recessive bit. This differential voltage across the bus lines 306, 308 is sensed by the data bus state sensor 322 to determine the state of the data bus 304. The bus state information, as detected by the data bus state sensor 322, is provided to the control block 320 for determining what action to take in overriding the data bus 304, if instructed to do so by the engine module 316.

In one or more embodiments, the VOD 302 is connected between the host computer 310 and the data bus 304 and functions, at least in part, to advantageously prevent physical intrusion on the data bus, which may include halting an unauthorized or otherwise invalid transmission (e.g., software/firmware update, etc.) from being completed, even after the transmission has started. In one or more embodiments, when an invalid transmission is found, the VOD 302 initiates a bus override routine whereby the VOD manipulates the bus 304, for example by either holding the bus to a prescribed voltage level or by overwriting the bus with a prescribed data message.

When controlling the data bus 304 during an initiated bus override action, the VOD 302 preferably drives the data bus 304 to a dominant state, thus signaling to the other connected nodes that the data bus is busy and thereby preventing transmissions from occurring over the data bus. In order to override the data bus 304 in this manner, the VOD 302 preferably includes a high line variable override circuit 324 and a low line variable override circuit 326, each of the override circuits being coupled to the control block 320 and to the data bus 304. Specifically, the high line variable override circuit 324 is connected to the CAN bus high line 306 and the low line variable override circuit 326 is connected to the CAN bus low line 308. Although the high line and low line variable override circuits are shown as separate circuits in FIG. 3, it is to be appreciated that, in alternative embodiments, the high line and low line variable override functionality may be integrated into the same circuitry.

In one or more embodiments, the high line variable override circuit 324 comprises one or more pull-up transistors (e.g., metal-oxide-semiconductor field-effect transistor (MOSFET), bipolar junction transistor (BJT), etc.) configured as a switch, such that when the transistor(s) is activated by a control signal supplied by the control block 320, the CAN bus high line 306 is forced to a prescribed voltage level (e.g., high voltage level, such as 3.75 V). Likewise, in one or more embodiments, the low line variable override circuit 326 comprises one or more pull-down transistors (e.g., MOSFET devices) configured as a switch, such that when the transistor(s) is activated by a control signal supplied by the control block 320, the CAN bus low line 308 is forced to a prescribed voltage level (e.g., low voltage level, such as 1.25 V). In one or more alternative embodiments, control signals supplied to the variable override circuits 324, 326 from the control block 320 function to selectively write a valid message on the data bus 304, advantageously overriding an invalid update from being sent across the data bus by one of the connected nodes (e.g., ECUs).

Figure 4A:
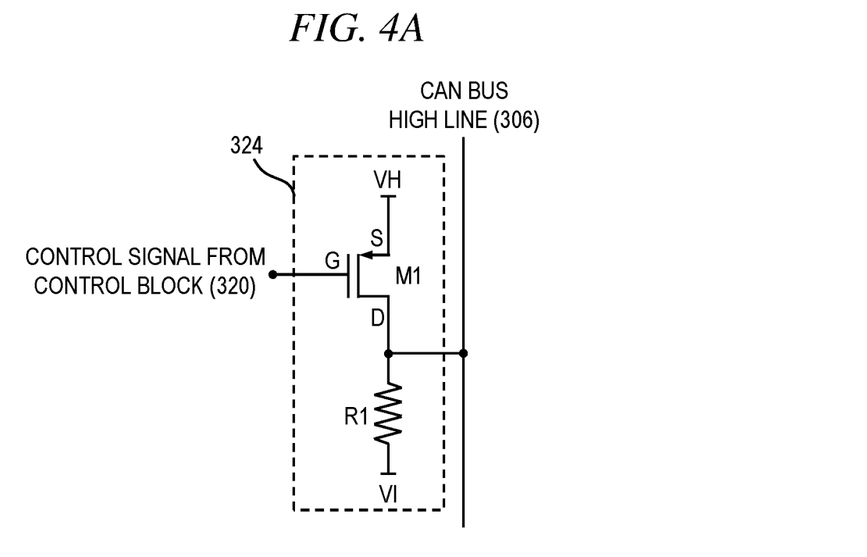
FIGS. 4A and 4B are schematic diagrams conceptually depicting at least a portion of exemplary simple high line and low line variable override circuits, respectively, suitable for use in the illustrative voltage override device shown in FIG. 3, according to one or more embodiments of the present invention.
Figure 4B:
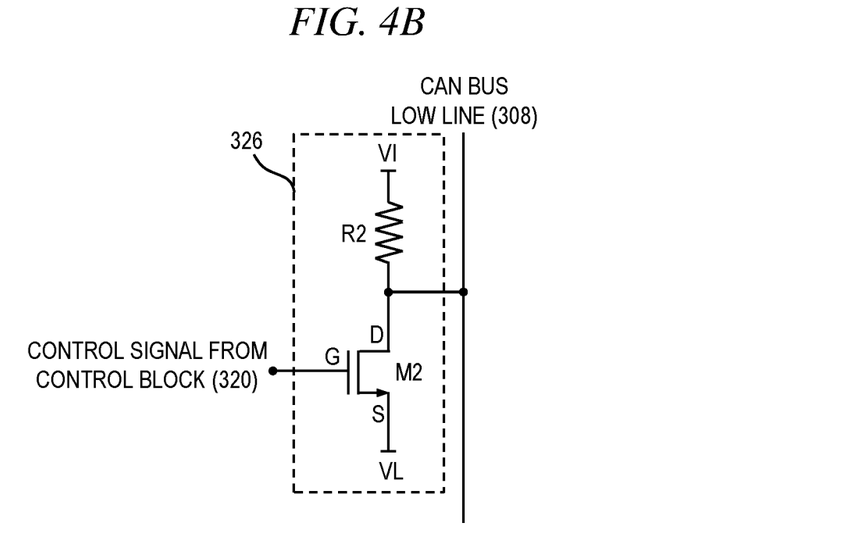

FIGS. 4A and 4B are schematic diagrams conceptually depicting at least a portion of exemplary simple high line and low line variable override circuits, respectively, suitable for use in the illustrative VOD 302 shown in FIG. 3. With reference to FIG. 4A, the high line variable override circuit 324 comprises a p-type MOSFET (PMOS) device, M1, including a source (S) connected with a bus high voltage source, VH, which may be about 3.75 V, a drain (D) connected with the CAN bus high line 306, and a gate (G) adapted to receive a control signal from the control block (320 in FIG. 3). Optionally, a load resistor, R1, preferably of high value, may be connected between the drain of PMOS device M1 and a bus idle voltage source, VI, which may be about 2.5 V. When activated, such as by a low voltage (0 V) applied to the gate terminal, PMOS device M1 will conduct (i.e., turn on), pulling up the CAN bus high line 306 to the voltage level of the bus high voltage source VH (e.g., about 3.75 V). When deactivated, resistor R1 serves to define the bus high line 306 at its idle voltage level (e.g., about 2.5 V).

Similarly, with reference to FIG. 4B, a low line variable override circuit 326 comprises an n-type MOSFET (NMOS) device, M2, including a source (S) connected with a bus low voltage source, VL, which may be about 1.25 V, a drain (D) connected with the CAN bus low line 308, and a gate (G) adapted to receive a control signal from the control block (320 in FIG. 3). Optionally, a load resistor, R2, preferably of high value, may be connected between the drain of PMOS device M1 and a bus idle voltage source VI, which may be about 2.5 V. When activated, such as by a high voltage (5 V) applied to the gate terminal, NMOS device M2 will conduct (i.e., turn on), pulling down the CAN bus low line 308 to the voltage level of the bus low voltage source VL (e.g., about 1.25 V). When deactivated, resistor R2 serves to define the bus low line 308 at its idle voltage level (e.g., about 2.5 V).

With reference again to FIG. 3, the VOD 302 also includes a power circuit or block 328 for generating one or more voltages. More particularly, the power block 328 comprises circuitry for generating a stable (e.g., regulated) voltage source which is supplied to the various functional modules/circuitry in the VOD 302. The power block 328 is preferably configured to supply variable and robust voltages which are selectively gated, as controlled by the control block 320, through the variable high line and low line override circuits 324 and 326, respectively, for overriding the existing data bus signal levels. In one or more embodiments, the power block 328 generates select voltage levels supplied to the CAN bus lines 306, 308 in a specifically designed and calibrated manner so as to oversaturate the existing bus line conditions without exceeding standard bus line fault condition protection tolerances specified for the particular bus protocol being used. Suitable circuitry for generating the required reference voltages (e.g., CAN bus high and low voltages, etc.), such as voltage regulators, voltage reference circuits, etc., will become apparent to those skilled in the art and will therefore not be discussed in further detail herein.

Figure 5A:
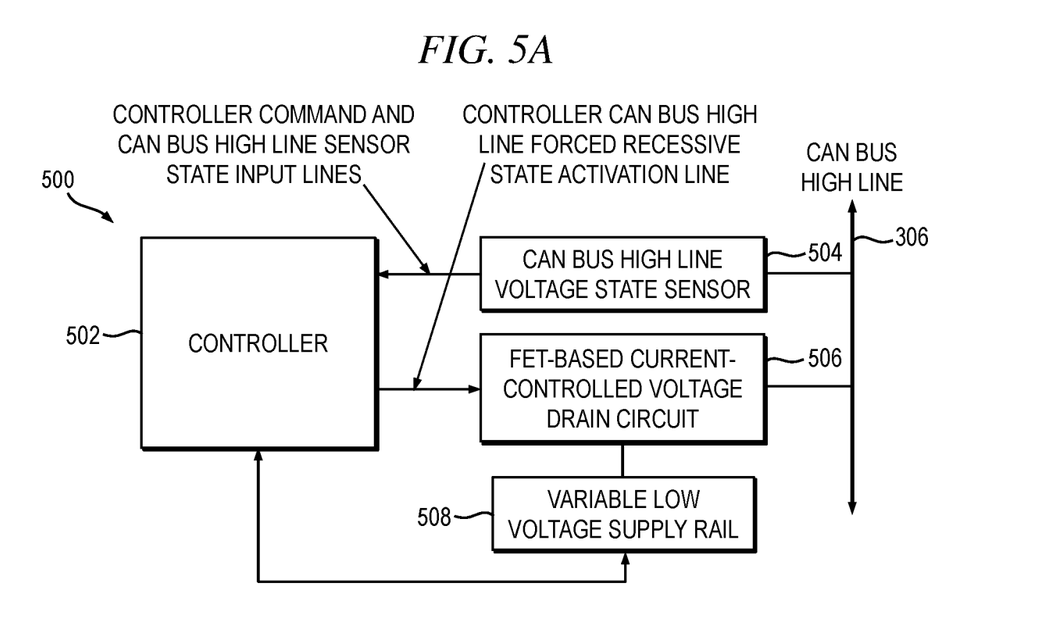
FIGS. 5A and 5B are block diagrams conceptually depicting at least a portion of exemplary high line and low line bus override state circuits, respectively, according to one or more embodiments of the present invention.
Figure 5B:
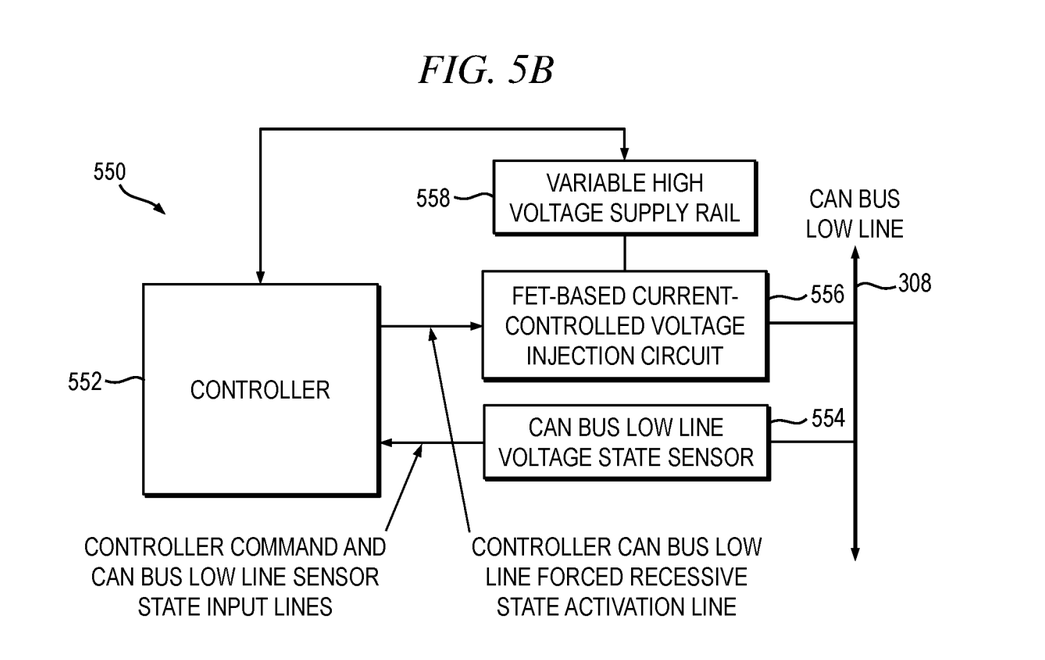

FIGS. 5A and 5B are block diagrams conceptually depicting at least a portion of exemplary high line and low line bus override state circuits, respectively, according to one or more embodiments of the invention. With reference first to FIG. 5A, a CAN bus high line recessive state override circuit 500 is shown which includes a controller 502 coupled to a CAN bus high line voltage state sensor circuit 504. The CAN bus high line voltage state sensor circuit 504, which in some embodiments is consistent with the data bus state sensor 322 in the illustrative VOD 302 of FIG. 3, is coupled to the CAN bus high line 306 and monitors the voltage present on the line and generates, as an output thereof, one or more command signals for use by the controller 502 in determining when to override the CAN bus.

The CAN bus high line recessive state override circuit 500 further includes a FET-based current-controlled voltage drain circuit 506 coupled to the controller 502 and the CAN bus high line 306. The voltage drain circuit 506 is adapted to receive one or more control signals from the controller 502 for causing the voltage drain circuit to activate a forced recessive state on the CAN bus high line 306. A variable low voltage supply rail 508, which may implement a portion of the variable supply power blocks 328 shown in FIG. 3, is coupled to the voltage drain circuit 506 and the controller 502, and is configured to provide the appropriate voltage levels for overriding the state of the CAN bus high line 306 in response to one or more control signals provided by the controller 502.

In a similar fashion, FIG. 5B depicts an exemplary CAN bus low line recessive state override circuit 550 which includes a controller 552, which may be integrated with the controller 502 shown in FIG. 5A, coupled to a CAN bus low line voltage state sensor circuit 554. The CAN bus low line voltage state sensor circuit 554, which in some embodiments is consistent with the data bus state sensor 322 in the illustrative VOD 302 of FIG. 3, is coupled to the CAN bus low line 308 and monitors the voltage present on the low line and generates, as an output thereof, one or more command signals for use by the controller 552 in determining when to override the CAN bus.

The CAN bus low line recessive state override circuit 550 further includes a FET-based current-controlled voltage injection circuit 556 coupled to the controller 552 and the CAN bus low line 308. The voltage injection circuit 556 is adapted to receive one or more control signals from the controller 552 for causing the voltage injection circuit to activate a forced recessive state on the CAN bus low line 308. A variable high voltage supply rail 558, which may implement a portion of the variable supply power blocks 328 shown in FIG. 3, is coupled to the voltage injection circuit 556 and the controller 552, and is configured to provide the appropriate voltage levels for overriding the state of the CAN bus low line 308 in response to one or more control signals provided by the controller 552.

Figure 6:
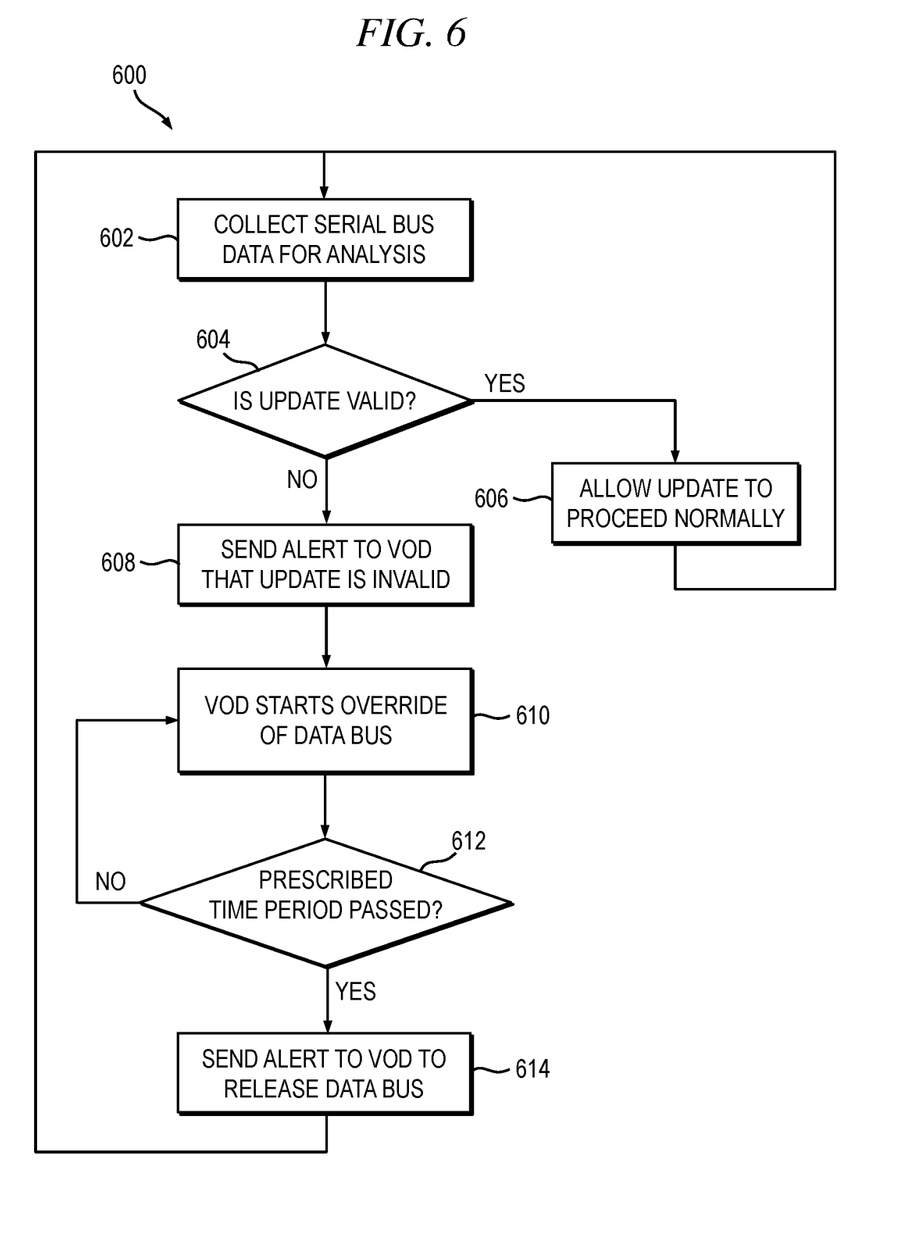
FIG. 6 is a flow diagram conceptually depicting at least a portion of an exemplary method for preventing the completion of invalid software and/or firmware updates on a communication bus, according to one or more embodiments of the present invention.

By way of example only and without limitation, FIG. 6 is a flow diagram conceptually depicting at least a portion of an exemplary method 600 for physical intrusion prevention (e.g., preventing the completion of invalid transmissions) on a data bus, according to one or more embodiments of the invention. With reference to FIGS. 3 and 6, in step 602, the data bus 304 is monitored (e.g., continuously or periodically) and data is collected for further processing by the engine module 316. When a connected device/node starts to send an invalid update across the data bus (e.g., data bus 304), the intake module 312 in the host computer 310 collects the transmitted data and presents it to the engine module 316 for processing and analysis.

In step 604, the collected data is checked (e.g., by the engine module 316 or other functional block) to determine whether an attempted update is valid or not. When the engine module 316 detects a valid update, the update is allowed to proceed on the data bus normally, without further intervention, in step 606. However, when the update is determined in step 604 to be invalid, an alert is sent to the VOD 302 by the engine module 316 in step 608, which instructs the VOD to initiate a data bus override procedure.

In step 610, the override procedure initiated by the VOD takes control of the data bus, such as by forcing the data bus to a dominant state or by transmitting a valid message frame on the data bus, for a prescribed period of time (i.e., until a control signal from the engine module 316 instructs the VOD 302 to release control of the data bus). This can be accomplished by selectively gating prescribed voltage levels generated by the power block 328 through the respective high line and low line variable override circuits 324, 326, as previously described. In one or more embodiments, the prescribed amount of time that the data bus is held at a dominant state will be just long enough for the connected node attempting to send the invalid update to time out. A sufficient time-out period will be specified by whatever bus protocol is being employed. In the context of a standard CAN bus protocol, in one or more embodiments, a suitable time-out period is preferably selected as a function of one or more parameters, including, for example, the bus bitrate, the message being transmitted/overwritten, and/or the higher level software behind the CAN controller.

Step 612 checks whether the prescribed time period has passed. If the prescribed time period has not yet passed, the method 600 continues to override the data bus in state 610 by holding the bus in its dominate state. When the prescribed time period has passed, as determined in step 612, an alert is sent to the VOD 302 (e.g., by the engine module 316) to release control of the data bus in step 614, such as by setting the variable override circuits 324, 326 to an idle state. The method 600 then continues to monitor the data bus and collect serial bus data in step 402 to detect invalid updates.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary apparatus illustrated in the accompanying figures (e.g., VOD 302 shown in FIG. 3), or portions thereof, may be part of an integrated circuit. Integrated circuits so manufactured are considered part of this invention.

Those skilled in the art will appreciate that the exemplary apparatus discussed above, or portions thereof, can be distributed in raw form (i.e., a single wafer having multiple unpackaged chips), as bare dies, in packaged form, or incorporated as parts of intermediate products or end products that benefit from systems and apparatus for prevention of unauthorized/invalid firmware and/or software upgrades between computing devices connected on a data bus, according to one or more embodiments of the invention.

An integrated circuit in accordance with aspects of the present disclosure can be employed, for example, in essentially any vehicle systems, weapon systems and/or other secure systems, among other applications. Systems incorporating such integrated circuits are considered part of this invention. Given the teachings of the present disclosure provided herein, one of ordinary skill in the art will be able to contemplate other implementations and applications of embodiments of the invention.

Embodiments of the present invention, or portions thereof, may also be implemented in the form of a system, a method, and/or a computer program product. In one or more embodiments, the computer program product may include a non-transitory computer readable storage medium (or media) having computer readable program instructions thereon for causing a processor or other controller, such as, for example, the engine module 316 in the host computer 310 and/or the control block 320 in the VOD 302 shown in FIG. 3, to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network (e.g., wireless LAN (WLAN)). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each of at least a subset of blocks of the flowchart illustrations and/or block diagrams, and combinations of blocks in the flowchart illustrations and/or block diagrams, can be implemented by computer readable program instructions.

These computer readable program instructions may be provided to one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block(s).

The flowchart and block diagrams in the accompanying figures illustrate the architecture, functionality, and operation of possible implementations of systems, methods, and computer program products according to one or more embodiments of the invention. In this regard, each of at least a subset of the blocks in the block diagrams and/or flowchart illustration may represent a module, segment, or portion of instructions, which comprises one or more executable instructions for implementing the specified function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that in one or more embodiments, each of at least a subset of blocks in the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, to the extent that such terms are used herein, where an element is referred to as being "connected" or "coupled" to another element, it can be directly connected or coupled to the other element or intervening elements can be present. In contrast, when an element is referred to as being "directly connected" or "directly coupled" to another element, there are no intervening elements present. Furthermore, positional terms such as "above," "below," "upper" and "lower," when used, are intended to indicate relative positioning of elements or structures to each other as opposed to absolute position.

The illustrations of embodiments of the invention described herein are intended to provide a general understanding of the various embodiments, and they are not intended to serve as a complete description of all the elements and features of apparatus and systems that might make use of the structures and semiconductor fabrication methodologies described herein. Many other embodiments will become apparent to those skilled in the art given the teachings herein; other embodiments are utilized and derived therefrom, such that structural and logical substitutions and changes can be made without departing from the scope or spirit of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein but within the scope of the present invention, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the present invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. An apparatus for preventing physical intrusion on a data bus, the apparatus comprising:
   a data bus state sensor operatively coupled to the data bus and configured to monitor a state of the data bus;
   a power circuit for generating a plurality of voltages supplied to functional circuitry in the apparatus;
   a variable override circuit coupled to the data bus and the power circuit, the variable override circuit being configured to receive one or more voltages from the power circuit and to selectively gate the one or more voltages onto the data bus as a function of one or more control signals provided to the variable override circuit; and
   a controller coupled to the variable override circuit, the power circuit and the data bus state sensor, the controller being configured to receive data bus state information from the data bus state sensor and to generate the one or more control signals provided to the variable override circuit in response to detection of physical intrusion on the data bus, the controller being configured to control a voltage level of at least one of the plurality of voltages generated by the power circuit for overriding the data bus when physical intrusion is detected on the data bus,
   wherein the data bus comprises first and second bus wires, and wherein the variable override circuit comprises at least one transistor configured as a switch, whereby when the at least one transistor is activated by a control signal supplied by the controller, at least one of the first and second bus wires is forced to a prescribed voltage level supplied by the power circuit.

2. The apparatus according to claim 1, wherein the controller is configured to receive instructions from an engine module connected to the apparatus to start or stop an override of the data bus upon detection of physical intrusion on the data bus.

3. The apparatus according to claim 1, wherein the data bus is a controller area network (CAN) bus comprising high and low bus wires, and wherein the data bus state sensor comprises voltage level sensing circuitry configured to monitor a differential voltage across the high and low bus wires for determining the state of the data bus.

4. The apparatus according to claim 1, wherein the data bus is a controller area network (CAN) bus comprising high and low bus wires, and wherein the variable override circuit comprises a high line variable override circuit adapted for connection to the high bus wire and a low line variable override circuit adapted for connection to the low bus wire.

5. The apparatus according to claim 4, wherein the high line variable override circuit comprises the at least one transistor configured as a pull-up transistor, such that when the pull-up transistor is activated by the control signal supplied by the controller, the high bus wire is forced to a prescribed high voltage level supplied by the power circuit.

6. The apparatus according to claim 4, wherein the low line variable override circuit comprises the at least one transistor configured as a pull-down transistor, such that when the pull-down transistor is activated by the control signal supplied by the controller, the low bus wire is forced to a prescribed low voltage level supplied by the power circuit.

7. The apparatus according to claim 4, wherein the high line variable override circuit comprises a current-controlled voltage drain circuit coupled to the controller and the high bus wire, the current-controlled voltage drain circuit being configured to receive at least one control signal from the controller for causing the current-controlled voltage drain circuit to activate a forced recessive state on the high bus wire.

8. The apparatus according to claim 4, wherein the low line variable override circuit comprises a current-controlled voltage injection circuit coupled to the controller and the low bus wire, the current-controlled voltage injection circuit being configured to receive at least one control signal from the controller for causing the current-controlled voltage injection circuit to activate a forced recessive state on the low bus wire.

9. The apparatus according to claim 1, wherein one or more control signals supplied to the variable override circuit from the controller function to selectively write a valid message on the data bus thereby overriding a detected invalid transmission from being sent across the data bus by at least one connected node on the data bus.

10. The apparatus according to claim 1, wherein the power circuit includes voltage reference circuitry for generating a plurality of prescribed voltage levels supplied to the data bus through the variable override circuit, the prescribed voltage levels being configured to oversaturate existing bus line conditions without exceeding bus line fault condition protection tolerances specified for a bus protocol being used by the data bus.

11. The apparatus according to claim 1, wherein the data bus is a serial data bus.

12. The apparatus according to claim 1, wherein the variable override device, in response to receiving one or more control signals generated by the controller that is indicative of physical intrusion detected on the data bus, is configured to perform at least one of: (i) forcing the data bus to a dominant state; (ii) forcing the data bus to a recessive state; and (iii) transmitting a valid message frame on the data bus.

13. The apparatus according to claim 1, wherein the controller, responsive to detection of physical intrusion on the data bus, is configured to provide the one or more control signals to the variable override circuit for taking control of the data bus by applying the one or more voltages to the data bus for a prescribed period of time, and for releasing the data bus by the variable override circuit once the prescribed period of time has elapsed.

14. A method for use in conjunction with a voltage override device for preventing physical intrusion on a data bus, the method comprising:
   collecting bus data for analysis;
   determining whether a transmission on the data bus is valid based at least in part on the collected bus data;
   sending an alert signal to the voltage override device when physical intrusion is detected on the data bus;
   initiating a bus override procedure in response to receipt of the alert signal by the voltage override device, whereby the voltage override device takes control of the data bus for a prescribed period of time; and
   releasing the data bus by the voltage override device once the prescribed period of time has elapsed,
   wherein the prescribed period of time will be at least equal to a time-out period for a node connected to the data bus attempting to send an invalid transmission.

15. The method according to claim 14, further comprising allowing the transmission on the data bus to proceed normally when the transmission is determined to be valid.

16. The method according to claim 14, wherein the bus override procedure comprises at least one of: (i) forcing the data bus to a dominant state; (ii) forcing the data bus to a recessive state; and (iii) transmitting a valid message frame on the data bus.

17. The method according to claim 16, wherein the voltage override device comprises a power circuit configured to generate a plurality of prescribed voltage levels, and a variable override circuit coupled to the data bus and the power circuit, the variable override circuit being configured to receive one or more voltages from the power circuit and to apply the one or more voltages to the data bus as a function of one or more control signals provided to the variable override circuit, and wherein forcing the data bus to a dominant state comprises selectively gating prescribed voltage levels generated by the power circuit onto the data bus through the variable override circuit.

18. The method according to claim 16, wherein a prescribed amount of time that the data bus is held at the dominant state will be at least equal to the time-out period for the node connected to the data bus attempting to send the invalid transmission.

19. The method according to claim 14, wherein the data bus is a serial data bus.

20. A computer program product for preventing physical intrusion on a data bus, the computer program product including a non-transient computer readable storage medium having computer readable program code embodied thereon, the computer readable program code, when executed on at least one processor of a security appliance coupled to the data bus, causing the security appliance:

to collect bus data for analysis;

to determine whether physical intrusion has occurred on the data bus based at least in part on the collected bus data;

to send an alert signal to a voltage override device when physical intrusion is detected on the data bus, the alert signal causing the voltage override device to initiate a bus override procedure, whereby the voltage override device takes control of the data bus for a prescribed period of time; and to cause the voltage override device to release the data bus once the prescribed period of time has elapsed, wherein the prescribed period of time will be at least equal to a time-out period for a node connected to the data bus attempting to send an invalid transmission.

21. A security apparatus for preventing physical intrusion on a data bus, the security apparatus comprising:

a data bus state sensor operatively coupled to the data bus and configured to monitor a state of the data bus;

a power circuit for generating a plurality of voltages;

a variable override circuit coupled to the data bus and the power circuit, the variable override circuit being configured to receive at least one of the plurality of voltages from the power circuit and to selectively gate the at least one voltage onto the data bus as a function of at least one control signal provided to the variable override circuit; and a controller coupled to the variable override circuit, the power circuit and the data bus state sensor, the controller being configured to receive data bus state information from the data bus state sensor and to generate the at least one control signal provided to the variable override circuit, responsive to detection of physical intrusion on the data bus, for initiating a bus override procedure, wherein the bus override procedure comprises:

applying, by the variable override circuit, the at least one of the plurality of voltages to the data bus, whereby the voltage override device takes control of the data bus for a prescribed period of time; and releasing the data bus by the variable override circuit once the prescribed period of time has elapsed, wherein the prescribed period of time will be at least equal to a time-out period for a node connected to the data bus attempting to send an invalid transmission.

* * * * *